(12) United States Patent
Glänzer et al.

(10) Patent No.: US 9,337,888 B2
(45) Date of Patent: May 10, 2016

(54) METHOD FOR RADIO TRANSMISSION BY ULTRA WIDEBAND TRANSMISSION

(71) Applicant: SIEMENS AKTIENGESELLSCHAFT, München (DE)

(72) Inventors: Ulrike Glänzer, Neubiberg (DE); Jörg Hüttner, Hof (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/415,517

(22) PCT Filed: Jun. 20, 2013

(86) PCT No.: PCT/EP2013/062827
§ 371 (c)(1),
(2) Date: Jan. 16, 2015

(87) PCT Pub. No.: WO2014/012734
PCT Pub. Date: Jan. 23, 2014

(65) Prior Publication Data
US 2015/0229351 A1    Aug. 13, 2015

(30) Foreign Application Priority Data
Jul. 19, 2012 (DE) .......................... 10 2012 212 689

(51) Int. Cl.
*H04B 1/7163* (2011.01)
*H04B 1/71* (2011.01)
(Continued)

(52) U.S. Cl.
CPC .............. *H04B 1/71* (2013.01); *H04B 1/71637* (2013.01); *H04L 25/4902* (2013.01); *H04L 27/2032* (2013.01)

(58) Field of Classification Search
CPC ... H04B 1/7163; H04B 1/71637; H04B 1/717
USPC .................................................. 375/130, 138
See application file for complete search history.

(56) References Cited

U.S. PATENT DOCUMENTS

| 5,960,031 A | 9/1999 | Fullerton et al. .............. 375/130 |
| 7,103,109 B2 | 9/2006 | Nakache et al. .............. 375/295 |

(Continued)

FOREIGN PATENT DOCUMENTS

| CN | 1722622 | 1/2006 |
| DE | 102012212689.9 | 7/2012 |

(Continued)

OTHER PUBLICATIONS

International Search Report for PCT/EP2013/062827 dated Oct. 15, 2013.

(Continued)

*Primary Examiner* — David B. Lugo
(74) *Attorney, Agent, or Firm* — Staas & Halsey LLP

(57) ABSTRACT

Message symbols are sent radio transmission using an ultra wideband transmitter emitting a pulse-phase-modulated transmission signal that has isolated pulses, each of which has a time offset in relation to a time pattern, which time offset is dependent on a message symbol that the pulse represents. The transmission signal has a line spectrum having a multiplicity of modulated frequency lines. The transmission signal is received at a receiver, which obtains a narrowband signal from a single one of the modulated frequency lines. The modulated frequency line includes a bandwidth that corresponds to less than twice a pattern frequency of the time pattern. A phase of the narrowband signal is ascertained at predetermined instants and the respectively ascertained phase is associated with one of a plurality of predetermined message symbols.

17 Claims, 3 Drawing Sheets

(51) Int. Cl.
*H04L 25/49* (2006.01)
*H04L 27/20* (2006.01)

(56) References Cited

U.S. PATENT DOCUMENTS

| | | | |
|---|---|---|---|
| 7,450,650 B2 | 11/2008 | Kim | ............................. 375/259 |
| 7,636,380 B2 | 12/2009 | Yao et al. | |
| 2005/0175068 A1 | 8/2005 | Nakache et al. | |
| 2005/0254553 A1 | 11/2005 | Yao et al. | |
| 2007/0081578 A1 | 4/2007 | Fudge et al. | |
| 2008/0084917 A1* | 4/2008 | Sung | ...................... H04B 1/719 375/130 |
| 2012/0045009 A1* | 2/2012 | Schleicher | ......... H04B 1/71635 375/268 |

FOREIGN PATENT DOCUMENTS

| | | | | |
|---|---|---|---|---|
| JP | 10508725 A | 8/1998 | ............... | H04B 1/69 |
| JP | 2004274764 A | 9/2004 | ............... | H04B 1/69 |
| JP | 2006517373 A | 7/2006 | ............... | H04B 1/69 |

OTHER PUBLICATIONS

Office Action in German Patent Application 102012212689.dated Mar. 20, 2013.

M. Z Win et al., "Impulse Radio: How It Works"; IEEE Communication Letters, vol. 2, No. 2, Feb. 1998; pp. 36-38.

M. Schmidt et al. "Spectral Properties of Ultra Wideband Signals with General Time-Hopping Codes"; EUROCON 2005; Nov. 22-24, 2005; pp. 124-127.

IEEE Standard 802.15.4aTM-2007 for Information technology—Telecommunications and information exchange between systems—Local and metropolitan area networks—Specific requirements, Part 15.4: Wireless Medium Access Control (MAC) and Physical Layer (PHY) Specifications for Low-Rate Wireless Personal Area Networks (WPANs) Amendment 1: Add Alternate PHYs; Aug. 2007; pp. 1-187.

Office Action dated Sep. 30, 2015 in corresponding Chinese Patent Application No. 201380038540.2.

* cited by examiner

METHOD FOR RADIO TRANSMISSION BY ULTRA WIDEBAND TRANSMISSION

CROSS REFERENCE TO RELATED APPLICATIONS

This application is the U.S. national stage of International Application No. PCT/EP2013/062827, filed Jun. 20, 2013 and claims the benefit thereof. The International Application claims the benefit of German Application No. 102012212689.9 filed on Apr. 11, 2012, both applications are incorporated by reference herein in their entirety.

BACKGROUND

Described below is a method for radio transmission of message symbols that are emitted as a wideband transmission signal by a UWB transmitter. UWB stands for ultra wideband (UWB) transmission, which is known per se and is also defined as the IEEE 802.15.4a standard in one form, for example. The wideband transmission signal is accordingly produced by pulse phase modulation (PPM—pulse position modulation) and therefore has a line spectrum having a multiplicity of modulated frequency lines. Pulse phase modulation is also called pulse position modulation in accordance with its designation above. Also described below is a system for radio transmission by ultra wideband transmission and a receiver for the system.

Pulse phase modulation is explained in more detail below with reference to FIG. 1. The figure shows a graph in which a control signal s for a UWB transmitter is plotted over time t, which control signal can control an oscillator for producing an electromagnetic radio signal, for example. During pulse phase modulation, the UWB transmitter can represent a succession 10 of message symbols 12, 12' as a train of impulses or pulses 14, 14' that are emitted in a manner shifted in time within a prescribed transmission pattern or time pattern 16. In this case, a time shift 20 for each pulse 14, 14' is dependent on the respective message symbol 12 that is represented by the pulse 14, 14'. If a binary signal is transmitted, for example, then what is known as the alphabet of the possible message symbols from the transmitter can consist of the message symbols "0" (provided with the reference symbol 12 in FIG. 1) and "1" (reference symbol 12'). In order to transmit a succession of zeros and ones, a pulse 14 can then be transmitted for the message symbol "0" in each case at an instant that coincides with the time pattern 16. By contrast, the message symbol "1" can then be represented, in each case, by a pulse 14' that is emitted in a manner shifted by one half of a pattern duration 22, as illustrated by the shift 20 in FIG. 1. The time pattern 16 defines a carrier frequency or pattern frequency frep, the reciprocal (1/frep) of which corresponds to the pattern duration 22 that is used to emit two successive pulses 14, 14' for one and the same message symbol 12, 12' when no additional coding measures, such as scrambling, are used. The time shift 20 for the message symbol "1" can then correspond to precisely 1/(2frep). The time signal for a single pulse may in each case be a square-wave pulse having a predetermined width, for example, or (as in the example from FIG. 1) else a differently shaped pulse 14, 14'. The actual electromagnetic transmission signal can also be shifted to a radio-frequency frequency range, e.g. between 1 and 10 GHz, by modulation, but this is not relevant to the explanation of the method.

The pulse-based transmission described is geared toward applications that require energy-saving inexpensive solutions. By way of example, this transmission allows the operation of wireless sensors with only a low energy requirement. The use of relatively narrow and hence wideband pulses additionally allows more robust data transmission, since cancellation effects as a result of multipath propagation (fading) have a much lower influence than in the case of narrowband transmission techniques A disadvantage of pulse-based UWB communication however, is that a relatively complex reception circuit is required at the receiver end. A correlation receiver is needed for the individual pulse signals that is able to be used to identify the individual pulses and to recognize the position thereof in the time pattern. This is very complex in terms of circuitry.

SUMMARY

Described below is a UWB communication device that is simple to realize in terms of circuitry.

The method is accordingly based on radio transmission of message symbols using a UWB transmitter that uses pulse phase modulation in the manner described at the outset to produce a wideband transmission signal from message symbols. In this context, an important aspect is that such a transmission signal has a line spectrum having a multiplicity of frequency lines, since a train of pulses emitted periodically at the pattern frequency has a line spectrum. Owing to the possible shifts in individual pulses in the time pattern over time, e.g. by half the pattern duration, a perfectly periodic signal is admittedly not obtained. In this case, an important insight is that the spectrum of the wideband transmission signal from a pulse phase modulation also continues to have a line spectrum. In this case, the time shift involves only some of the frequency lines being altered by the pulse phase modulation in comparison with a spectrum for an equidistant pulse train. Each frequency line altered by the pulse phase modulation in comparison with the unmodulated line spectrum is referred to as a modulated frequency line in this case. Depending on the type of pulse phase modulation used, these frequency lines are widened or split into a group having a plurality of small frequency lines.

On the basis of the method, the receiver does not reconstruct the time signal for the pulse train from the transmission signal again in order to ascertain the message symbols sent. The reason is that this would mean processing the complete bandwidth of the transmission signal. Instead, the transmission signal is received by a receiver that obtains just a narrowband signal from one of the modulated frequency lines. All in all, the narrowband signal has a bandwidth that corresponds to less than twice the pattern frequency of the time pattern on which the pulse phase modulation of the UWB transmitter is based. This bandwidth is referred to as narrowband in this case. The spectral width of the narrowband signal is significantly less than the entire bandwidth of the transmission signal, which may be more than ten times the pattern frequency. Accordingly, wideband is understood in this case to mean a spectral range that corresponds to at least five times the pattern frequency.

For reconstructing the sent succession of message symbols, a phase of the narrowband signal is ascertained from the narrowband signal by the receiver at predetermined instants. The respectively ascertained phase is then associated with one of the plurality of predetermined message symbols from the alphabet of the transmitter.

The method has the advantage that it is only necessary to provide a receiver that can process a narrowband signal. Such a receiver is significantly simpler to realize in terms of circuitry than a receiver that is able to process the entire wideband transmission signal. In particular, a receiver that is suitable for carrying out the method can be formed from a receiver for a PSK (phase shift keying) signal, if need be by slight alterations to circuitry. For example, a PSK receiver may be used. In this connection, the method also covers the use of a narrowband PSK receiver for obtaining the message symbols from the wideband UWB transmission signals.

The inventors had the following insight: when single pulses in the pulse train of the transmission signal are emitted with a variable time offset, a line spectrum is obtained with the frequency lines that are repeated at regular spectral intervals in the line spectrum. Only some of the frequency lines are altered by the pulse modulation in comparison with an unmodulated signal in this case. The spectral bandwidth of a component of a modulated frequency line of this kind that is significant to reception may be up to twice freq, where freq indicates the pattern frequency mentioned. It has been found that reliable recognition of the message symbols requires only observation of a single modulated frequency line of this kind. The narrowband time signal for a modulated frequency line of this kind is a signal that is sinusoidal at least in sections and that has certain phase changes at predetermined points. The narrowband signal can be isolated from the transmission signal by a bandpass filter.

In an embodiment, the narrowband signal is first of all demodulated to a baseband by the receiver in order to ascertain the phase. Following downward modulation of the transmission signal, a low-pass filter can also be used to isolate the narrowband signal. Furthermore, digital processing of the narrowband signal is possible.

The location at which a suitable modulated frequency line is found in the spectrum of the transmission signal can be inferred from the known pattern frequency and the known modulation method. According to one embodiment of the method, the narrowband signal from a modulated frequency line whose center frequency is an uneven multiple of the pattern frequency of the transmission pattern is evaluated. It is then possible to recognize message symbols from a binary alphabet that are distinguished from one another by a shift by one half of a pattern duration.

In order to transmit a single message symbol, the UWB transmitter can also produce a plurality of successive pulses in each case that have the same time shift in the time pattern of the pulse phase modulation (multiple sending). The resultant transmitter signal can still be evaluated correctly by the receiver. In addition, there is the advantage that recognition of the message symbols is more robust owing to the redundancy and at the same time the spectral width of the modulated frequency lines is less than in the case of a transmission signal with only one pulse per message symbol.

If the bandwidth of the narrowband signal is not critical, the UWB transmitter can also emit a single message symbol in the form coded as a predetermined train of pulses. This also allows transmission that is more robust toward interference signals to be achieved. In this case, the method is advantageously also compatible with such scrambling of the pulses.

A further advantage arises when the receiver also obtains a reference signal from the transmission signal. The phase of the reference signal may be necessary as a reference phase in order to use the narrowband signal to recognize not only the single pulses but also the absolute time position thereof in the time pattern of the transmitter. The reference signal may be obtained from a sinusoidal signal from a further (unmodulated) frequency line of the line spectrum. This embodiment of the method uses the insight that not all frequency lines are influenced by the pulse phase modulation. Some frequency lines remain unaltered, regardless of which succession of message symbols is sent. From these frequency lines, it is therefore possible to obtain the reference signal for providing the reference phase. In case of the transmission variant described above with a binary alphabet and a shift of one half of a pattern duration, the frequency of the further frequency line may be an even multiple of the pattern frequency stipulated by the time pattern of the pulse phase modulation of the UWB transmitter. For other transmission modes, it is possible to use spectral analysis of the transmission signal, for example, to find suitable frequency lines.

Also described below is a receiver that is designed to receive a transmission signal and to reconstruct message symbols from the received transmission signal. The receiver is furthermore designed to obtain from the received transmission signal a narrowband transmission signal that corresponds to a modulated frequency line on a line spectrum of the transmission signal and whose bandwidth corresponds to less than twice the pattern frequency. Furthermore, the receiver is designed to ascertain a respective phase of the narrowband signal at predetermined instants and to form a reference phase from a sinusoidal signal from a further (unmodulated) frequency line of the line spectrum. The receiver furthermore compares the ascertained phase with the reference phase and thereby ascertaining a value for a phase shift in the narrowband signal in relation to the sinusoidal signal and associating this ascertained value with one of a plurality of predetermined message symbols. From a circuit or digital implementation of the receiver, it is possible to resort to variants that are known per se from the prior art. For obtaining the reference signal and the reference phase thereof, it is possible to use a method for obtaining a carrier signal as a reference signal for demodulation of a modulated carrier, for example. The obtainment of the narrowband signal, the ascertainment of the phase thereof and the association of the phase difference value with a message symbol can be carried out on the basis of the principle of PSK demodulation.

For the method, a plurality of the modulated frequency lines in the line spectrum are suitable for obtaining the narrowband signal in principle. In order to use this advantageously, according to one embodiment of the method, the receiver first of all checks a plurality of modulated frequency lines of the line spectrum for a signal quality, particularly a signal-to-noise ratio and/or a signal power. The modulated frequency line to be used that is then selected from this plurality is a modulated frequency line from which the signal quality exceeds a predetermined threshold value. This allows flexible reaction to interference sources. Precisely the same procedure can also be used for determining a suitable unmodulated frequency line for obtaining the sinusoidal reference signal.

It is advantageously also possible to use a plurality of modulated frequency lines for parallel, simultaneous evaluation of the transmitter signal. To this end, according to one embodiment of the method, a phase of a narrowband signal from at least one further modulated frequency line of the line spectrum is evaluated in the cited manner and a respective further message symbol is reconstructed therefrom. From all reconstructed message symbols, one is then stipulated as the sent message symbol. If three or more frequency lines are evaluated, for example, a majority decision can decide about the correct message symbol.

As already explained, the system for radio transmission of message symbols that has a UWB transmitter provided for producing a wideband transmission signal from the message symbols by pulse position modulation or pulse phase modulation. In order to receive the transmission signal and in order to reconstruct the message symbols from the received transmission signal a receiver is provided that is designed to ascertain from a modulated frequency line of a line spectrum of the wideband transmission signal a narrowband signal whose bandwidth corresponds to less than twice a pattern frequency of a time pattern of the pulse phase modulation and to ascertain a respective phase of the narrowband signal at predetermined instants and to associate it with one of a plurality of predetermined message symbols in accordance with a predetermined association rule. In this case, the instants are obtained from the time pattern of the transmitter. The system allows the method described below to be carried out. For realizing the receiver of the system, it is possible to resort to the design of a receiver for a PSK signal in principle.

Corresponding developments of the receiver and the system that have already been described in connection with the developments of the method are described below and are not described again at this juncture.

BRIEF DESCRIPTION OF THE DRAWINGS

These and other aspects and advantages will become more apparent and more readily appreciated with reference to specific exemplary embodiments, taken in conjunction with the accompanying drawings of which.

DETAILED DESCRIPTION OF THE PREFERRED EMBODIMENT

In the examples explained below, the described components of the system are each single features of the invention that are intended to be considered independently of one another and that each also develop the invention independently of one another and hence can also be regarded as part of the invention individually or in a combination other than that shown. Furthermore, the embodiment described can also be augmented by further instances of the already described features of the invention.

Figure 1:
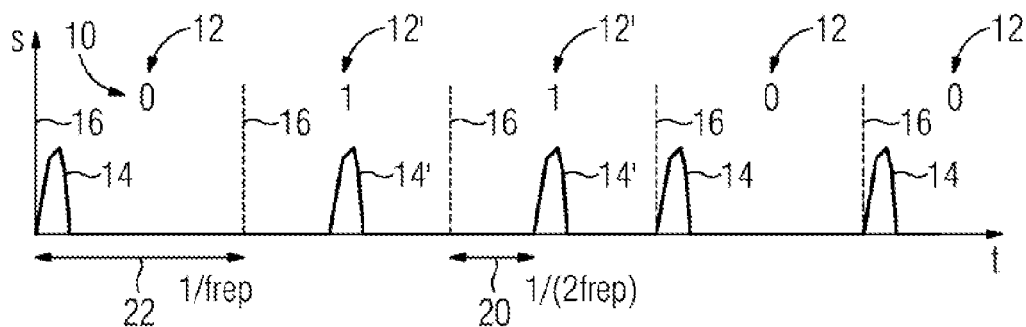
FIG. 1 shows a graph with a pulse train for controlling an oscillator of a UWB transmitter.
Figure 2:
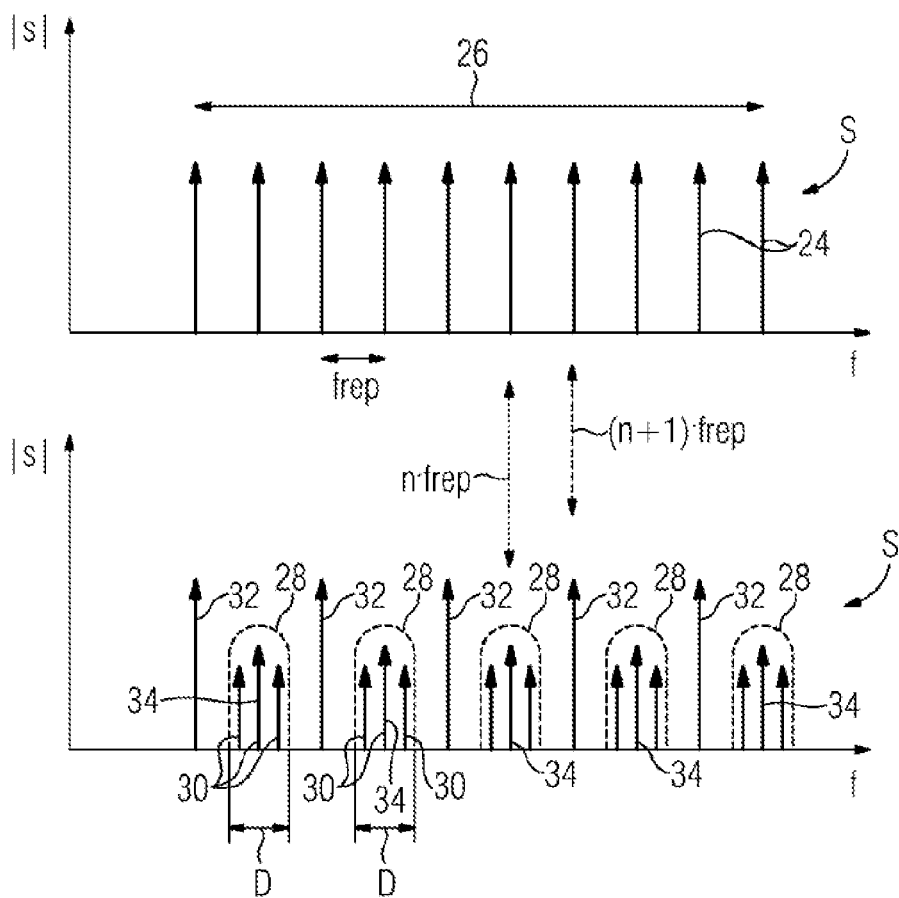
FIG. 2 shows two graphs with line spectra for a transmitter signal for the UWB transmitter.

The top graph in FIG. 2 has an absolute value |S| for a line spectrum S of a transmitter signal for a UWB transmitter plotted over frequency f, as obtained when the UWB transmitter emits pulses with a respective time signal or pulse signal p(t) in a time pattern with a pattern duration 1/f rep. In other words, the pulses are emitted at identical intervals of time of 1/frep, that is to say at a repetition rate frep. The pulses are thus equidistant. The line spectrum S has a multiplicity of frequency lines 24, only some of which are provided with a reference symbol in FIG. 2 for the sake of clarity. An entire bandwidth 26 of the line spectrum S may be 1 GHz, for example.

The line spectrum S is the spectrum of the time signal s(t) of the pulse train. The time signal can be described as:

$$s(t) = p(t) * \sum_k d(t-k/frep) = \sum_k p(t-k/frep),$$

where d( ) is the Dirac impulse, π is the number Pi and the * symbol is the convolution operator. The sum index k can theoretically include all natural numbers, while s(t) describes the emitted signal. It results from the convolution of a single pulse signal p(t) with an impulse comb having the periodicity freq. If the signal is considered in the frequency domain, the line spectrum S is obtained, the lines of which are at the interval frep from one another. By contrast, the shape and position of the spectrum are determined by the spectral shape P(w) and the frequency of the pulse signal p(t).

$$S(w) = P(w) \sum_l d(w - 2\pi l frep),$$

where w=2πf is the angular frequency. The sum index l can theoretically include all whole numbers.

From the point of view of a narrowband receiver, these are therefore narrowband, sinusoidal signal components at different carrier frequencies:

$$s(t) = \sum_l P(2\pi l frep) \exp(j 2\pi l frep \, t),$$

where exp ( ) is the exponential function and j is the imaginary unit $j^2=-1$.

For the case of a PPM modulated signal, it is found for the spectrum S that the phase of some of the sinusoidal carrier signals must likewise be altered, since the phase of the RF carrier is always in an integer multiple relationship with the phase of the repetition rate. If the position of the pulse sequence is changed, the phase of the sinusoidal carrier frequency also changes.

For the purpose of illustration, the bottom graph in FIG. 2 shows the line spectrum S as may arise when the UWB transmitter shifts the pulses in relation to the time pattern by pulse phase modulation in order to transmit a succession of different message symbols. In the present example, a binary alphabet (message symbols "0" and "1") and a shift by one half of a pattern duration for one of the message symbols is the basis.

The spectrum S has a plurality of modulated frequency lines 28, only some of which are again provided with a reference symbol for the sake of clarity. In the case of the pulse phase modulation method used here, each modulated frequency line 28 is formed of single frequency lines 30 of decreased amplitude, i.e., single frequency lines 24 have each been split into a group of frequency lines 30 by the pulse phase modulation in this case. Alternatively, the modulated frequency line 28 may be a widened frequency line 24 that has been spectrally "smudged". Other frequency lines 32 of the spectrum S are not altered by the pulse phase modulation, on the other hand. The unaltered frequency lines 32 have frequencies that correspond to an even multiple of a pattern frequency freq of the time pattern of the pulse phase modulation. Center frequencies 34 of the modulated frequency lines 28 correspond to an uneven multiple of the pattern frequency freq. A bandwidth D of each group of smaller frequency lines 30 from a modulated frequency line 28 is less than twice the pattern frequency frep. FIG. 2 clarifies all of these relationships by indicating a factor n that corresponds to an uneven number.

Figure 3:
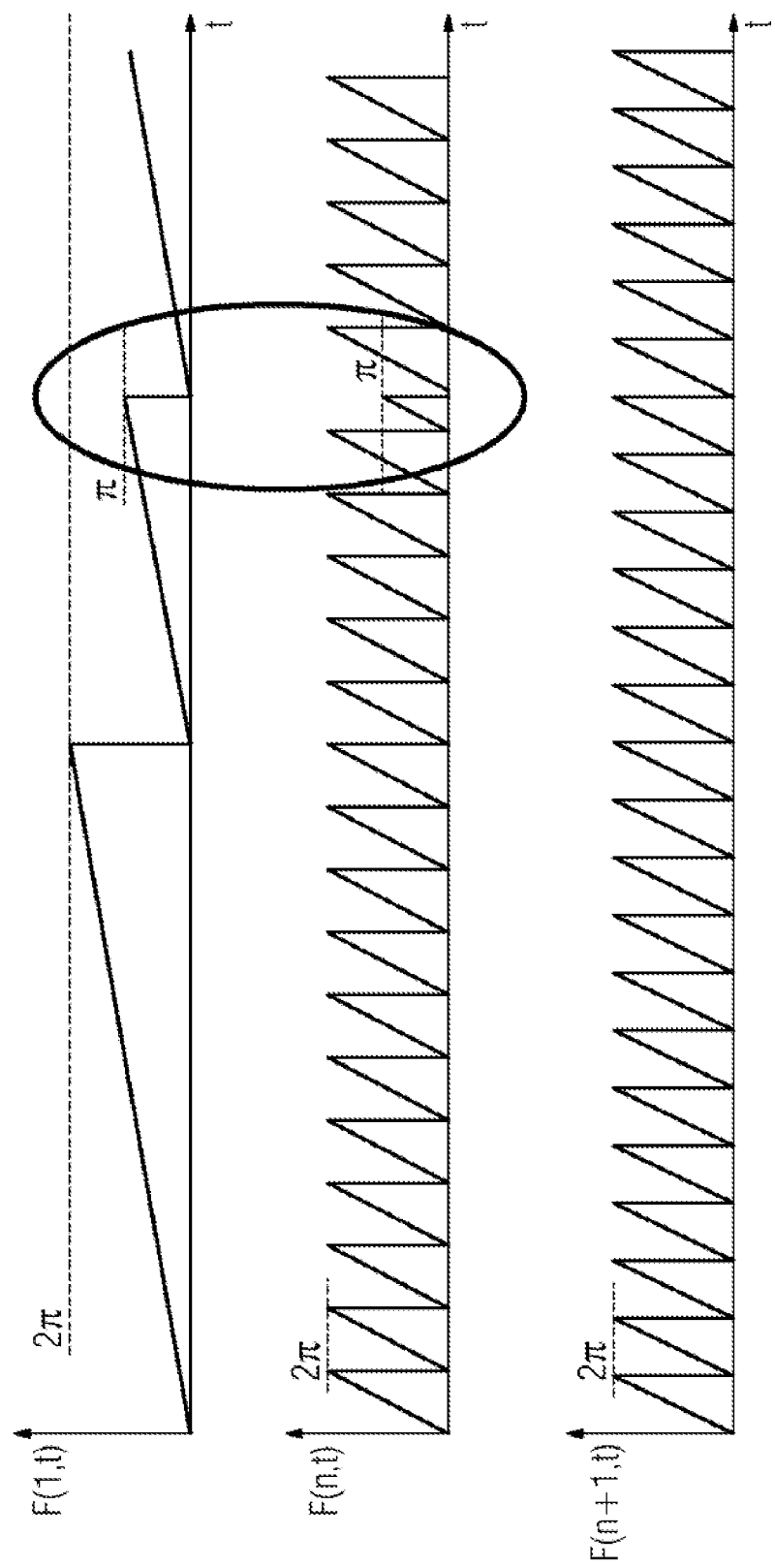
FIG. 3 shows three phase diagrams to explain the line spectra of FIG. 2.

FIG. 3 illustrates the formation of the modulated frequency lines 28. The top graph shows the phase F(1,t) of the sinusoidal signal component at the basic repetition rate frep of a single pulse signal p(t), which is shifted in relation to the time pattern, over time t. The phase F(n,t) of the narrowband sinusoidal signal components at an uneven multiple carrier frequency n times frep is modulated, whereas the carriers are preserved in unmodulated form at an even multiple (n+1) of the pulse repetition rate freq, i.e. the phase F(n+1,1) is not influenced by the pulse shift. The time profile of the phase F(n+1,t) can therefore be used as a reference phase. A comparison of the profiles of the phase F(n,t), for example, with that of the phase F(n+1,t) then indicates when a pulse has been sent that has an offset in relation to the time pattern of the transmitter.

A PPM can therefore be converted into a PSK modulation for uneven multiples of carriers of the pulse repetition rate frep.

Hence, in principle, an emitted UWB pulse signal can be received using a receiver architecture that corresponds to that for a PSK receiver.

Data transmission involves changeover between the two PPM positions. The changeover needs to be effected such that the receiver bandwidth is not exceeded. This can result in a plurality of "shifted" pulses needing to be emitted in succession in order to represent a symbol. This method firstly reduces the modulation bandwidth and secondly increases a processing benefit at the receiver end.

In order to confer further robustness on the data transmission, the symbols may also contain a coding.

Figure 4:
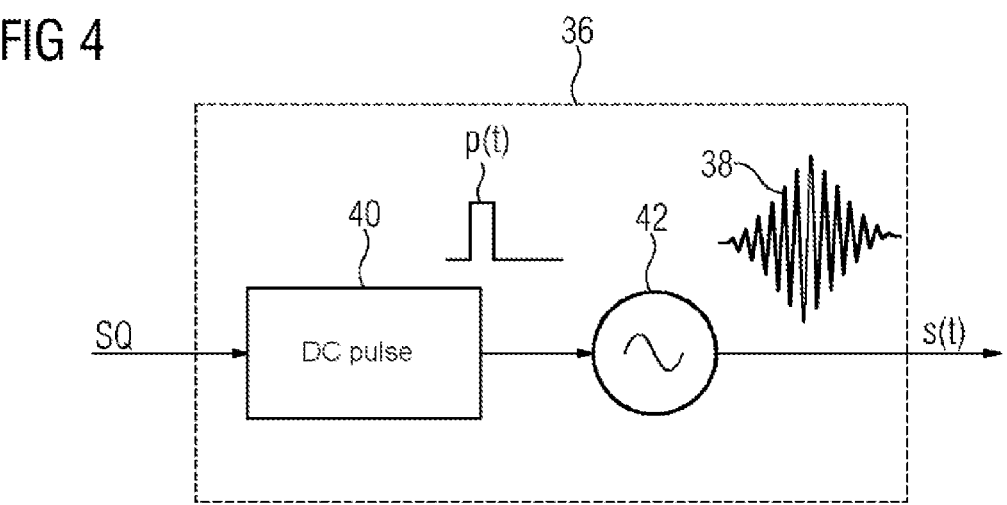
FIG. 4 shows a block diagram that illustrates the basic design of a transmitter in an embodiment of the system.

A possible implementation of the transmitter shown in FIG. 4 is formed of two blocks. First of all, the relevant transmission frequency is generated, and this takes place digitally and can be executed in an FPGA (field programmable gate array) or CPLD (complex programmable logic device), for example. This sequence SQ then controls the impulse generator 36. There are various methods for generating coherent RF pulses 38. That shown relates to the use of a DC (DC voltage signal) generator 40 that actuates an RF oscillator 42. When a pulse p(t) is received, the RF oscillator always builds up with the same phase (coherent buildup). This architecture requires few components and allows an adjustable position for the RF pulse 38. The coherent buildup prevents the modulated frequency lines 28 from being distorted by phase differences in the carrier signals of the individual pulses.

Unwanted modulation of the further frequency lines 32 is also prevented.

Figure 5:
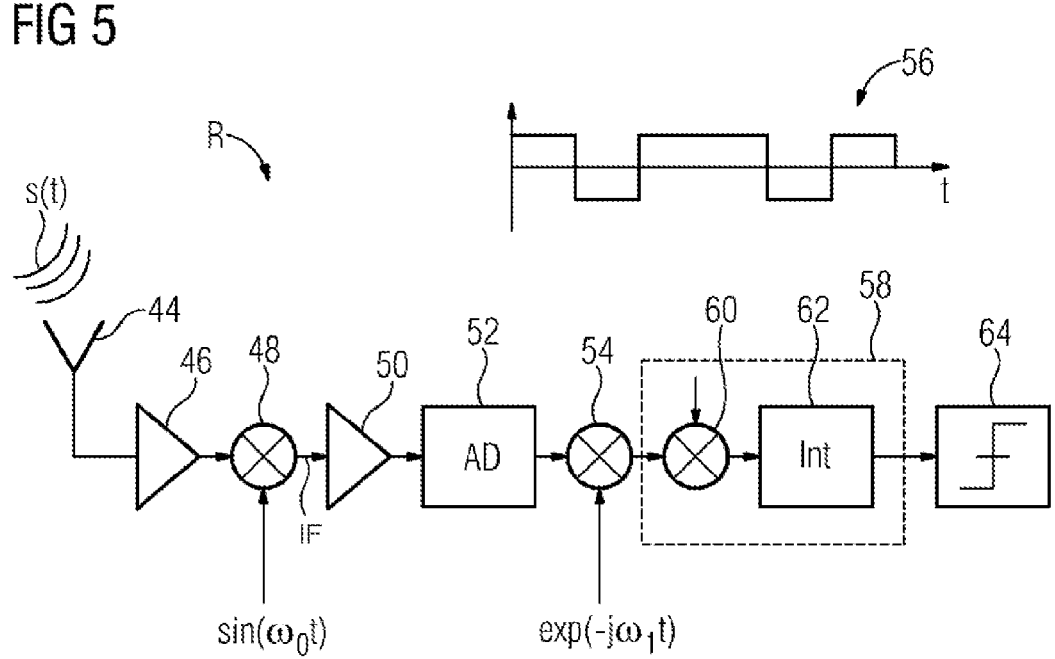
FIG. 5 shows a block diagram that illustrates the basic design of an embodiment of the receiver.

A possible architecture for a receiver R is shown in FIG. 5. Input amplification of the transmission signal s(t) received via an antenna 44 by an amplifier 46 is followed by down conversion by a mixer 48 to an intermediate frequency band IF. The down-converted signal is then filtered and amplified by a further analogue circuit 50, digitized by an analogue-to-digital converter 52 and digitally down-converted by a digital mixer 54 to a baseband BB. The realization of the receiver shown in FIG. 5 may be based by way of example on DDS-PLL (direct digital synthesis—phase locked loop) architecture for producing the mixer circuit frequencies w0 and w1. In principle, however, any other variants that produce the required carrier frequency are possible. Particular advantages are also obtained when the even multiple frequency lines 32 are jointly sensed and evaluated. This allows coherent reception of the signal to be realized.

There are various options for making reception of the PSK signal more robust. Firstly, the number of shifted pulses per message signal can be increased. Secondly, for the data transmission, it is possible to use a coding, e.g. by using a sample sequence 56 for each pulse, that provides an additional procession benefit depending on length. The sample sequence 56 can then be compared with the baseband signal digitally by a correlator 58 formed by a multiplier 60 and an integrator 62.

A decision-maker 64 then indicates the instant at which a complete sample sequence 56 has been recognized. A comparison with the time pattern then allows the pulse on which the sample sequence 56 is based to be associated with one of the message symbols ("0" or "1").

Instead of the correlator 58, it is also possible for other signal evaluation to take place that reconstructs the phase profile F(n,t) directly, for example. For this, the prior art provides a large number of solutions, e.g., PSK demodulation.

The evaluation can also be performed at a plurality of frequencies, and hence the robustness of the system can be additionally increased. A further option provided by the simultaneous transmission of the frequency lines is selection of the frequency lines that are suitable in the best possible manner from the transmitted signal. This allows narrowband interference sources to be precluded or cancellation effects to be avoided.

The system has the advantage that the advantages of a UWB pulse system at the transmission end and the advantages of a PSK receiver at the reception end are combined with one another. The transmitter only requires a pulse oscillator that builds up coherently and that is interspersed with a suitable pulse train that is produced by the PPM. This means that no complex generation of an RF signal is needed. On the other hand, the receiver does not need a correlation receiver for the pulse signal but rather requires only PSK receiver architecture. In addition, the method provides the advantage that each frequency line 32 repeated on an even-numbered basis delivers the carrier information and hence there is no need for complex carrier recovery for coherent reception.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for radio transmission of message symbols by an ultra wideband transmitter emitting a pulse-phase-modulated transmission signal that includes isolated pulses, each pulse having a time offset, in relation to a time pattern, that is dependent on a message symbol that the pulse represents, the pulse-phase-modulated transmission signal having a line spectrum with multiple frequency lines, said method comprising:

receiving the pulse-phase-modulated transmission signal by a receiver;

producing, by the receiver, a reference signal having a reference phase;

obtaining, by the receiver, a narrowband signal from a modulated frequency line of the line spectrum, the narrowband signal having a bandwidth corresponding to less than twice a pattern frequency of the time pattern;

ascertaining, by the receiver at predetermined instants, a phase of the narrowband signal from a sinusoidal signal from a further frequency line of the line spectrum, based on the reference signal; and associating each phase ascertained by the receiver with one of a plurality of predetermined message symbols.

2. The method as claimed in claim 1, wherein said ascertaining comprises demodulating the narrowband signal to a baseband.

3. The method as claimed in claim 2, further comprising evaluating the narrowband signal from a modulated frequency line having a center frequency that is an uneven multiple of the pattern frequency.

4. The method as claimed in claim 3, further comprising transmitting a single message symbol by the ultra wideband transmitter using pulses that have an identical time shift in the time pattern.

5. The method as claimed in claim 4, wherein said transmitting by the ultra wideband transmitter includes emitting the single message symbol encoded as a predetermined train of pulses.

6. The method as claimed in claim 5, further comprising producing, by the receiver, a reference signal having a reference phase for said ascertaining of the phase of the narrowband signal from a sinusoidal signal from a further frequency line of the line spectrum.

7. The method as claimed in claim 6, wherein the further frequency line has a frequency that is an even multiple of a frame frequency.

8. The method as claimed in claim 7, further comprising, by the receiver prior to said obtaining,
checking modulated frequency lines in the line spectrum for signal quality based on at least one of signal-to-noise ratio and signal power; and
selecting the modulated frequency line, from among the modulated frequency lines, for which the signal quality exceeds a predetermined threshold value.

9. The method as claimed in claim 8, further comprising:
ascertaining a further phase of a further narrowband signal from at least one further modulated frequency line of the line spectrum;
reconstructing a further message symbol from each further phase; and
determining, from all reconstructed message symbols, the single message symbol sent by the ultra wideband transmitter.

10. The method as claimed in claim 1, further comprising evaluating the narrowband signal from a modulated frequency line having a center frequency that is an uneven multiple of the pattern frequency.

11. The method as claimed in claim 1, further comprising transmitting a single message symbol by the ultra wideband transmitter using pulses that have an identical time shift in the time pattern.

12. The method as claimed in claim 1, wherein said transmitting by the ultra wideband transmitter includes emitting the single message symbol encoded as a predetermined train of pulses.

13. The method as claimed in claim 1, wherein the further frequency line has a frequency that is an even multiple of a frame frequency.

14. The method as claimed in claim 1, further comprising, by the receiver prior to said obtaining,
checking modulated frequency lines in the line spectrum for signal quality based on at least one of signal-to-noise ratio and signal power; and
selecting the modulated frequency line, from among the modulated frequency lines, for which the signal quality exceeds a predetermined threshold value.

15. The method as claimed in claim 1, further comprising:
ascertaining a further phase of a further narrowband signal from at least one further modulated frequency line of the line spectrum;
reconstructing a further message symbol from each further phase; and
determining, from all reconstructed message symbols, a single message symbol sent by the ultra wideband transmitter.

16. A system for radio transmission of message symbols, comprising:
an ultra wideband transmitter producing a wideband transmission signal from the message symbols by pulse phase modulation; and
a receiver receiving the wideband transmission signal, producing a reference signal having a reference phase and reconstructing the message symbols from the wideband transmission signal by obtaining, from a modulated frequency line of a line spectrum of the wideband transmission signal, a narrowband signal having a bandwidth corresponding to less than twice a pattern frequency of a time pattern of the pulse phase modulation; ascertaining, at predetermined instants, a phase of the narrowband signal from a sinusoidal signal from a further frequency line of the line spectrum, based on the reference signal; and associating a message symbol with each phase that is ascertained.

17. A receiver in a system for radio transmission of message symbols, comprising:
an interface receiving a pulse-phase-modulated transmission signal having a line spectrum with a multiplicity of frequency lines altered by the pulse modulation; and
at least one processor programmed to reconstruct message symbols from the pulse-phase-modulated transmission signal received by said interface by
obtaining, from the pulse-phase-modulated transmission signal received by said interface, a narrowband signal including a modulated frequency line of the line spectrum of the pulse-phase-modulated transmission signal and having a bandwidth corresponding to less than twice a pattern frequency of a time pattern of the pulse phase modulation;
ascertaining, at predetermined instants, an ascertained phase of the narrowband signal;
forming a reference phase from a sinusoidal signal from another frequency line of the line spectrum;
comparing the ascertained phase with the reference phase to determine a phase difference value for a phase shift in the narrowband signal in relation to the sinusoidal signal; and
associating the phase difference value with one of a plurality of predetermined message symbols.

* * * * *